Aug. 7, 1945.  F. BRINER  2,381,103
PORTABLE HOPPER
Filed Feb. 26, 1943  2 Sheets-Sheet 2
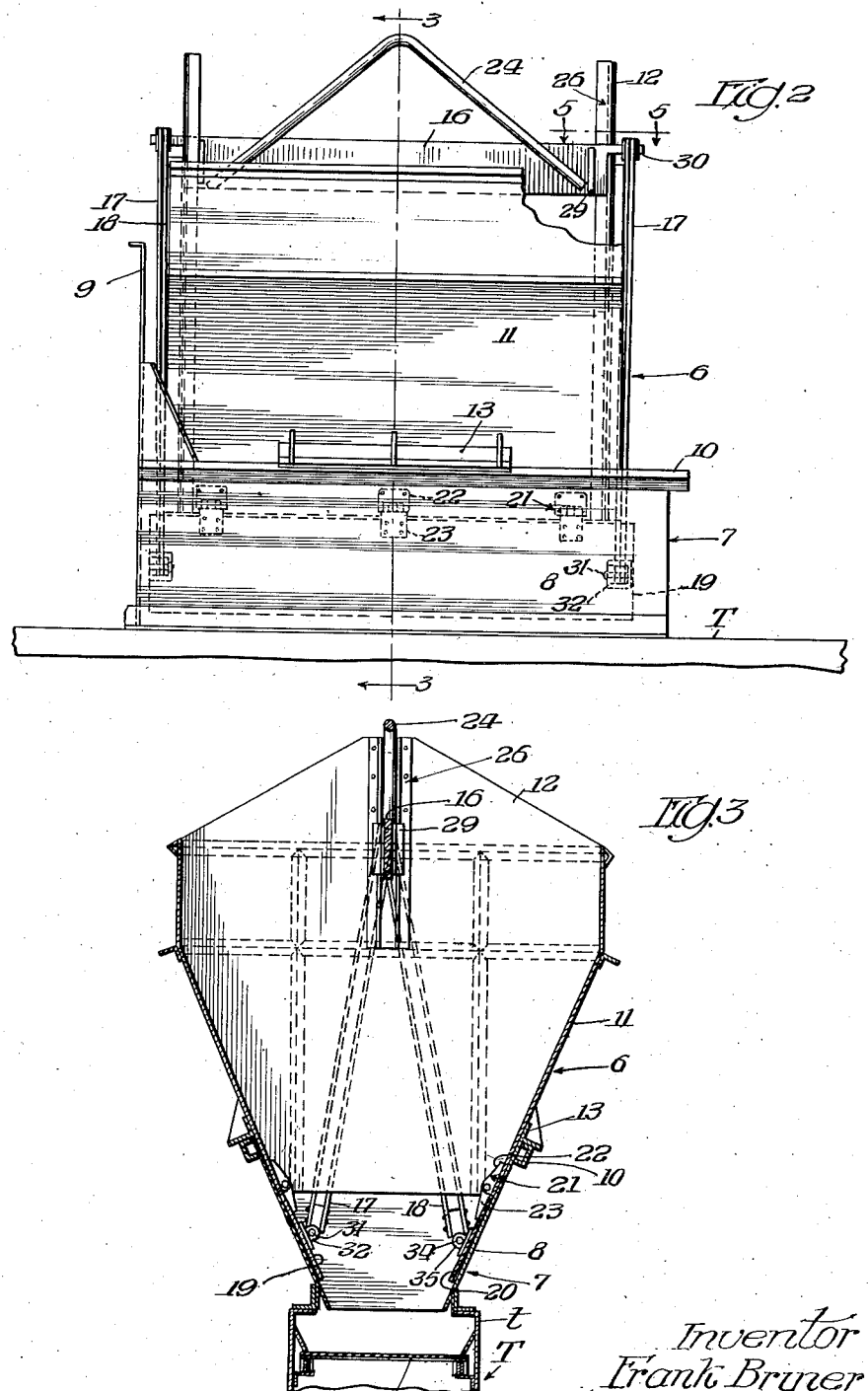
Inventor
Frank Briner
By Fred Gerlach
Atty.

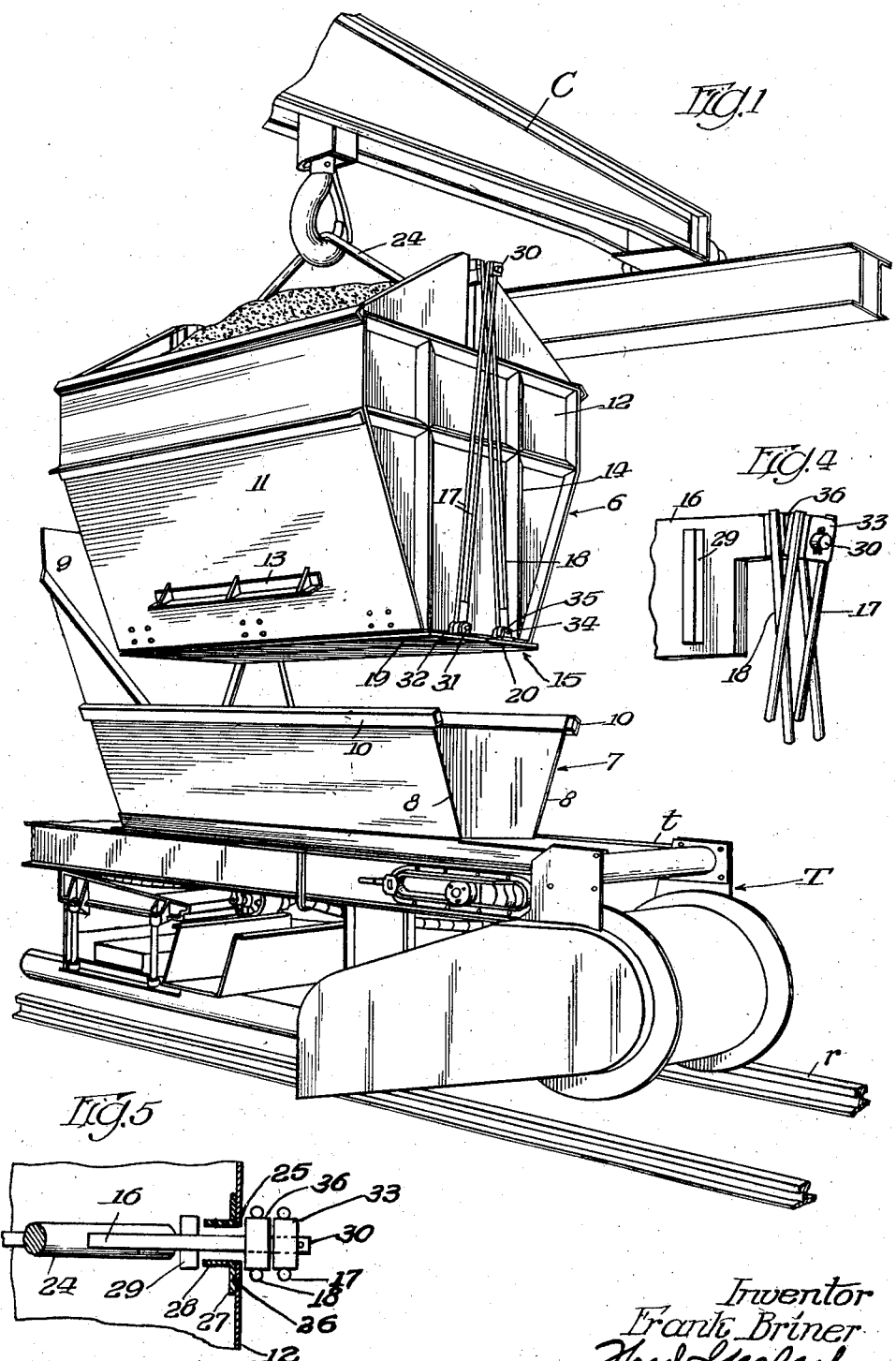

Patented Aug. 7, 1945

2,381,103

UNITED STATES PATENT OFFICE 2,381,103

PORTABLE HOPPER

Frank Briner, Chester, Pa., assignor to The Beardsley & Piper Company, Chicago, Ill., a corporation of Illinois Application February 26, 1943, Serial No. 477,317

1 Claim. (Cl. 294—71)

The present invention relates to hoppers. More particularly the invention relates to that type of hopper which is adapted to be moved from place to place by an overhead travelling crane, serves as a medium for temporarily holding sand or other material, and has a hinged bottom.

One object of the invention is to provide a portable hopper which is an improvement upon, and has certain advantages over, previously designed hoppers of like type or character.

Another object of the invention is to provide a portable hopper of the type under consideration which embodies at the top thereof a longitudinally extending, centrally disposed, vertically slidable bar with an upstanding bail for attachment to the hook of the overhead crane, and also embodies links which extend between, and are pivotally connected to, the bar and the hinged bottom, and are arranged so that they operate automatically to close the bottom when the bar is raised in connection with hoisting of the hopper, and also to swing the bottom into its open position when the hopper is brought to rest on a suitable supporting structure and the bar is released from the hook of the crane.

A further object of the invention is to provide in connection with a portable hopper of the type and character last mentioned, a supporting structure which is in the form of an auxiliary hopper and is adapted telescopically to receive the portable hopper.

A still further object of the invention is to provide a portable hopper which is generally of new and improved construction and is characterized by efficiency of operation and durability.

Other objects of the invention and the various advantages and characteristics of the present portable hopper and its supporting structure will be apparent from a consideration of the following detailed description.

The invention consists in the several novel features which are hereinafter set forth and are more particularly defined by the claim at the conclusion hereof.

In the drawings which accompany and form a part of this specification or disclosure and in which like letters and numerals of reference denote corresponding parts throughout the several views:

Figure 1 is a perspective showing a portable hopper embodying the invention supported by an overhead crane over the auxiliary hopper constituting the supporting structure for the portable hopper;

Figure 2 is a side elevation showing the portable hopper in telescopic relation with the auxiliary hopper and after it has been released from the hook of the overhead crane;

Figure 3 is a vertical transverse section taken on the line 3—3 of Figure 2 and showing the manner in which the two gates constituting the hinged bottom of the portable hopper lap the sides of the auxiliary hopper when the two hoppers are in operative or telescopic relation and the bar is released from the hook of the crane;

Figure 4 is a fragmentary perspective illustrating the manner in which the upper ends of the links are pivotally connected to the longitudinally extending, vertically slidable bar; and Figure 5 is a section taken on the line 5—5 of Figure 2 and showing in detail the manner in which the ends of the bar are slidably connected to the ends of the portable hopper.

The portable hopper which is shown in the drawings constitutes the preferred form or embodiment of the invention. It is designated by the reference numeral 6 and is associated and adapted for use in connection with an auxiliary hopper 7 on a wheel equipped truck T like that, for example, which is employed in connection with the mold filling machine forming the subject matter of United States Patent No. 1,774,076, dated August 26, 1930. As hereinafter described, the hopper 6 is adapted to be moved from place to place by way of an overhead travelling crane C and serves as a medium for temporarily holding sand or other material. The truck T is adapted to travel along a track beneath the crane C and in the form of a pair of laterally spaced rails r and comprises a frame t on which the auxiliary hopper 7 is mounted. The auxiliary hopper has an open bottom and comprises a pair of flat, upwardly diverging sides 8 and a front end wall 9. It is adapted to support the portable hopper 6 and to receive sand therefrom. The sides 8 of the auxiliary hopper are connected to, and project upwardly and outwardly from, the side beams of the truck frame t. The upper margins of the sides 8 are straight and have associated therewith horizontally disposed channel beams 10 for reenforcing purposes. These beams are disposed along the outer faces of the sides 8 of the auxiliary hopper and are welded in place. They are preferably arranged so that the flanges thereof project inwards. The front end wall 9 serves as a closure for the front end of the auxiliary hopper and is welded or otherwise fixedly secured to the front end margins of the sides 8. The open bottom of the auxiliary hopper 7 overlies a horizontally extending endless conveyor $t^1$. The latter is suitably mounted on the frame $t$ of the truck T and is adapted when driven to deliver sand from the auxiliary hopper 7 to the front end of the truck T.

The portable hopper 6 comprises a pair of sides 11 and a pair of end walls 12. The sides are preferably formed of plate steel and are disposed in opposed and laterally spaced relation. The lower portions of the sides are downwardly convergent, as shown in Figures 1 and 3 of the drawings, and are adapted when the portable hopper is in telescopic relation with the auxiliary hopper 7 to fit against and lap the inner faces of the sides 8 of the auxiliary hopper. Horizontally extending lugs 13 in the form of angle bars are secured to, and project outwards from, the lower portions of the sides 11 and serve to limit downward movement of the portable hopper with respect to the auxiliary hopper 7 when the two hoppers are in telescopic relation. These lugs are located a short distance above the lower margins of the sides 11 and are adapted to rest on the channel beams 10, as shown in Figures 2 and 3. As shown in Figure 3, the lugs 13 are so positioned that when the portable hopper 6 is in telescopic relation with the auxiliary hopper the lower edges or margins of the sides 11 of the portable hopper are located adjacent the central portions of the sides 8 of the auxiliary hopper. The end walls 12 of the portable hopper 6 extend between, and are welded or otherwise suitably secured to, the end margins of the sides 11. They are formed of plate steel and have angle bars 14 welded to their outer faces for reenforcing purposes. The upper portions of the side walls 12 project above the upper edges or margins of the sides 11 and are triangular in contour.

In addition to the sides 11 and the end walls 12 the portable hopper 6 comprises a bottom 15, a bar 16, a pair of links 17 and a pair of links 18. The bottom 15 serves as a closure for the portable hopper during movement thereof to and from the auxiliary hopper 7. It consists of a pair of opposed, parallel, plate type gates 19 and 20 and these are connected by hinges 21 to the lower margins of the sides 11 so that they are adapted to swing back and forth between a closed or operative position wherein they underlie and extend across the bottom of the portable hopper 6 and an open position wherein they extend downwards (see Figure 3). The hinges 21 are preferably disposed within the portable hopper 6 and consists of hinge parts 22 which are fixed to the inner faces of the bottom margins of the sides 11 and hinge parts 23 which are pivotally connected to the hinge parts 22 and are fixed to the outer side margins of the plate type gates 19 and 20 constituting the bottom 15. The gates 19 and 20 are of such length that the ends thereof project beyond the end walls 12. The bar 16 is located at the top of the portable hopper 6 and is disposed longitudinally and centrally of the latter. It is operatively connected to the gates 19 and 20 by way of the links 17 and 18 and has at the central portion thereof an upstanding ball 24 for attachment to the hook of the overhead travelling crane C. The ends of the bar 16 are slidably mounted in vertically extending slots 25 in the upper triangularly shaped portions of the end walls 12 of the portable hopper 6. The slot defining portions of the end walls 12 are reenforced by way of vertically extending angle bars 26 and these comprise outer legs 27 and inner legs 28. The outer legs fit against, and are welded or otherwise fixed to, the slot defining portions of the end walls 12 and the inner legs 28 extend at right angles to the outer legs and are spaced apart a distance corresponding to the width of the slots 25. Vertically extending strips 29 are secured to the ends of the bar 16 and coact with the inner edges of the inner legs 28 of the angle bars 26 to prevent longitudinal displacement of the bar 16 relatively to the portable hopper 6. The extremities of the bar 16 project outwards of the end walls 12 and are provided with outwardly extending coaxial pintles 30. The links 17 extend substantially vertically and are disposed outwards of the end walls 12 of the portable hopper 6. The lower ends of the links 17 are pivotally connected to the inner corners of the plate type gate 19 by way of pivot pins 31. The latter extend through holes in the lower ends of the links 17 and are carried by upstanding lugs 32 on said inner corners of the gate 19. The upper ends of the links 17 are provided with apertured pivot blocks 33 and these are mounted on the pintles 30. The links 18 extend substantially vertically. They are disposed outwards of the end walls 12 of the portable hopper 6 and serve operatively to connect the bar 16 to the plate type gate 20. The lower ends of the links 18 are pivotally connected to the inner corners of the gate 20 by way of pivot pins 34 and these extend through holes or apertures in the lower ends of the links 18 and are carried by upstanding lugs 35 on the inner corners of the gate 20. The upper ends of the links are provided with apertured pivot blocks 36 and these are mounted on the pintles 30 at the end extremities of the bar 16. When the bar 16 is raised relatively to the portable hopper 6 the links 17 and 18 cause the plate type gates 19 and 20 to swing upwards into their operative position wherein they close the bottom of the hopper. When the portable hopper is arranged in telescopic relation with, and supported by, the auxiliary hopper 7 and the bar 16 is released the gates 19 and 20, due to the weight of the sand in the portable hopper and the weight of the links and bar, swing downwards into their open position.

When it is desired to use the portable and auxiliary hoppers 6 and 7 the portable hopper is removed from the auxiliary hopper by way of the overhead crane C and is then shifted or transferred to a sand loading point. In connection with removal of the portable hopper 6 from the auxiliary hopper 7 the hook of the overhead crane C is applied to the ball 24 and then raised so as to effect hoisting of the portable hopper. When the hook is initially raised the bar 16 slides upwards relatively to the hopper 6 and operates through the medium of the links 17 and 18 to swing the gates 19 and 20 into their closed position. As soon as the gates assume such position upward sliding movement of the bar 16 relatively to the hopper 6 ceases and further hoisting of the crane hook results in hoisting of the portable hopper. After raising of the portable hopper from the auxiliary hopper the crane C is propelled to the sand charging point. At such point the portable hopper may be filled with sand while it is suspended from the crane hook or it may be filled after it has been lowered onto the floor. If the portable hopper is lowered onto the floor in connection with a sand charging operation the floor holds the gates 19 and 20 constituting the hopper bottom in their closed position even though the crane hook is disconnected from the ball 24. The portable hopper 6, after charging thereof, is hoisted by the crane 6 and the latter is propelled until the portable hopper is in overlying relation with the auxiliary hopper 7 on the wheel equipped truck T. As soon as the portable hopper is disposed in such relation with the auxiliary hopper 7 it is lowered so as to bring the bottom portion thereof into telescopic relation with the upper portions of the sides 8 of the auxiliary hopper. The portable hopper is lowered until the lugs 13 strike against the channel bars 10 on the upper margins of the sides 8 of the auxiliary hopper 7. Thereafter the hook of the crane C is disengaged from the bail 24. As soon as the crane hook is disengaged from the bail the bar 16 is released with the result that it slides downwards to the lower ends of the slots 25 and effects opening of the gates 19 and 20. Upon freeing of the bail 24 from the crane hook, the gates automatically open due to the weight of the sand in the portable hopper and the combined weight of the links 17 and 18 and the bar 16. The gates 19 and 20 are held in their open position as a result of abutment against the lower portions of the sides 8 of the auxiliary hopper 7. When the two gates are in their open position the sand in the portable hopper 6 passes downwards through the auxiliary hopper 7 onto the endless conveyor $t^1$ of the truck T.

The herein described portable hopper and auxiliary hopper effectively and efficiently fulfill their intended purpose and contemplate, due to the arrangement and design of the bar 16 and the links 17 and 18 and the gates 19 and 20, automatically opening of the portable hopper when it is lowered into supported relation with the auxiliary hopper. The portable hopper is characterized by the fact that the vertically movable bar 16 at the top thereof serves not only as a means for attaching the portable hopper to the hook of the overhead crane, but also as a medium for automatically swinging the gates constituting the hopper bottom into their closed position when the portable hopper is raised or elevated out of telescopic relation with the auxiliary hopper 7. The two hoppers coact with one another and have many capabilities of use.

The invention is not to be understood as restricted to the details set forth since these may be modified within the scope of the appended claim without departing from the spirit and scope of the invention.

Having thus described the invention what I claim as new and desire to secure by Letters Patent is:

Hopper equipment comprising an auxiliary hopper including a pair of opposed spaced apart flat downwardly convergent sides, embodying an open bottom and provided with means for supporting it in an elevated position, and a portable hopper consisting of a continuous side wall structure in the form of a pair of opposed spaced apart sides with flat downwardly convergent lower portions and a pair of end walls extending between, and connected to, the end margins of the sides and provided with vertically extending aligned slots in the upper portions thereof, adapted to fit removably in the upper portion of the auxiliary hopper in such manner that the lower portions of the sides fit against and lap the inner faces of the sides of said auxiliary hopper and provided on said lower portions of the sides thereof with outwardly extending lugs adapted to rest on the upper edges of said sides of the auxiliary hopper, a pair of opposed bottom forming plate type gates hinged to the bottom margins of the sides of the wall structure so as to swing up and down between closed and open positions, a horizontal bar extending lengthwise across the upper portion of the side wall structure, having the ends thereof mounted in the slots so that it is capable of vertical sliding movement, provided at its ends with outwardly projecting vertically extending strips arranged to coact with the slot defining portions of the end walls in such manner as to prevent longitudinal displacement of the bar relatively to the structure, and also provided with means at its central portion for attachment to a hoisting apparatus, and pairs of upstanding links disposed outwards of the end walls of the structure, having their upper ends pivotally connected to the ends of the bar and their lower ends pivotally connected to the distal corners of the gates and adapted to swing the gates upwards into their closed position when the bar is moved upwards relatively to the portable hopper in connection with removal of said hopper from the auxiliary hopper and to swing the gates downwards into their open position when the bar is released from the hoisting apparatus and moved downwards relatively to the portable hopper after such hopper is in supported relation with the auxiliary hopper.

FRANK BRINER.